United States Patent
Yue et al.

(10) Patent No.: US 10,374,702 B1
(45) Date of Patent: Aug. 6, 2019

(54) METHODS AND APPARATUS FOR PREDICTING AND MONITORING PERFORMANCE OF A COHERENT OPTICAL TRANSCEIVER AT VARIOUS BAUD RATES

(71) Applicant: Juniper Networks, Inc., Sunnyvale, CA (US)

(72) Inventors: Yang Yue, Milpitas, CA (US); Qiang Wang, San Carlos, CA (US); Xuan He, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 20 days.

(21) Appl. No.: 15/858,364

(22) Filed: Dec. 29, 2017

(51) Int. Cl.
*H04B 10/079* (2013.01)

(52) U.S. Cl.
CPC . *H04B 10/07953* (2013.01); *H04B 10/07955* (2013.01)

(58) Field of Classification Search
CPC .................... H04B 10/07953; H04B 10/07955
See application file for complete search history.

(56) References Cited

U.S. PATENT DOCUMENTS

| | | | |
|---|---|---|---|
| 2008/0138088 A1* | 6/2008 | Welch | H01S 5/026 398/183 |
| 2015/0381273 A1* | 12/2015 | Gloeckner | H04B 10/40 398/16 |

* cited by examiner

*Primary Examiner* — Casey L Kretzer
(74) *Attorney, Agent, or Firm* — Cooley LLP

(57) ABSTRACT

In some embodiments, an apparatus includes an optical transceiver having a photo diode and a processor configured to be operatively coupled to the photo diode. The photo diode is configured to measure a set of receiver optical power (ROP) values at a set of baud rate values. The processor is configured to measure a set of bit error rate (BER) values of a digital modulated signal at the set of baud rate values. The processor is configured to determine an estimated optical signal noise ratio (OSNR) value at a baud rate value from the set of baud rate values based on the set of ROP values and the set of BER values. The processor is configured to send a signal indicating the estimated OSNR value at the baud rate value such that a planned route is selected to send data signals based on the estimated OSNR value.

22 Claims, 9 Drawing Sheets

900

902 Measure, by a photo diode of an optical transceiver, a set of receiver optical power (ROP) values at a set of baud rate values and send the ROP values to a processor of the optical transceiver.

908 Measure, by the processor, a set of bit error rate (BER) values of a digital modulated signal at the set of baud rate values at an input port of the optical transceiver.

910 Determine an estimated optical signal noise ratio (OSNR) value at a baud rate value from the set of baud rate values at the input port of the optical transceiver based on the set of ROP values and the set of BER values.

912 Send a signal indicating the estimated OSNR value such that a planned route is selected for sending data signals through within the optical transceiver based on the estimated OSNR value.

FIG. 9

METHODS AND APPARATUS FOR PREDICTING AND MONITORING PERFORMANCE OF A COHERENT OPTICAL TRANSCEIVER AT VARIOUS BAUD RATES

CROSS-REFERENCE TO RELATED APPLICATIONS

This application is related to U.S. patent application Ser. No. 15/197,646, filed Jun. 29, 2017, entitled "Methods and Apparatus for Predicting and Monitoring Performance of a Coherent Optical Transceiver," the contents of which is incorporated by reference in its entirety.

BACKGROUND

Some embodiments described herein relate generally to methods and apparatus for optical communication. In particular, but not by way of limitation, some embodiments described herein relate to methods and apparatus for performance monitoring of coherent optical communication system at various baud rates.

With the increase in the amount of data to be communicated, optical communication systems have evolved to operate at higher data rates. For instance, some recent optical communication systems operate in the 100 gigabits per second (Gbps) range. Most long-haul optical communication systems use optical amplifiers to compensate for the attenuation introduced by optical fiber. While the optical signal is boosted, noise is also added, which can limit the transmission distance. Therefore, it is desirable to monitor the optical signal noise ratio (OSNR) of a coherent optical receiver. Known systems that can monitor the performance of a coherent optical receiver, however, are expensive and complex.

The U.S. patent application Ser. No. 15/197,646 discusses methods and apparatus to predict and monitor performance of a coherent optical transceiver at a fixed baud rate (e.g., 32 GHz) and with a modulation format(s) (e.g., a polarization-multiplexed quadrature-phase-shift-keying (PM-QPSK)).

Accordingly, a need exists for improved and simplified methods and apparatus to monitor performance of a coherent optical receiver at various baud rates.

SUMMARY

In some embodiments, an apparatus includes an optical transceiver configured to be operatively coupled to a network. The optical transceiver includes a photo diode and a processor configured to be operatively coupled to the photo diode. The photo diode is configured to measure multiple receiver optical power (ROP) values at multiple baud rate values and send the multiple ROP values to the processor. The processor is configured to measure multiple bit error rate (BER) values of a digital modulated signal at the multiple baud rate values at an input port of the optical transceiver. The processor is configured to determine an estimated optical signal noise ratio (OSNR) value at a baud rate value from the multiple baud rate values at the input port of the optical transceiver based on the multiple ROP values at the multiple baud rate values and the multiple BER values at the multiple baud rate values. The processor is configured to send a signal indicating the estimated OSNR value at the baud rate value such that a planned route is selected to send data signals based on the estimated OSNR value.

BRIEF DESCRIPTION OF THE DRAWINGS

FIG. 9 is a flow chart illustrating a method of an improved OSNR performance measurement of an optical transceiver, according to an embodiment.

DETAILED DESCRIPTION

In some embodiments, an apparatus includes an optical transceiver configured to be operatively coupled to a network. The optical transceiver includes a photo diode and a processor configured to be operatively coupled to the photo diode. The photo diode is configured to measure multiple receiver optical power (ROP) values at multiple baud rate values and send the multiple ROP values to the processor. The processor is configured to measure multiple bit error rate (BER) values of a digital modulated signal at the multiple baud rate values at an input port of the optical transceiver. The processor is configured to determine an estimated optical signal noise ratio (OSNR) value at a baud rate value from the multiple baud rate values at the input port of the optical transceiver based on the multiple ROP values at the multiple baud rate values and the multiple BER values at the multiple baud rate values. The processor is configured to send a signal indicating the estimated OSNR value at the baud rate value such that a planned route is selected to send data signals based on the estimated OSNR value.

In some embodiments, when an optical transceiver is in a design verification test mode, such as during a manufacturing operation, a calibration operation, a trouble-shooting operation or an upgrading operation, the transmitter of the optical transceiver can be connected to the receiver of the optical transceiver through one of an optical switch integrated within the optical transceiver, or an external loop-back connection. Such an optical switch and/or the loop-back connection can facilitate the measurements of the receiver optical power (ROP) value and the bit error rate (BER) value at various baud rates (e.g., up to 86 GHz). Given that the BER vs OSNR curve and BER vs ROP curve can be intrinsically correlated, the BER vs OSNR curve at various baud rates can be predicted or estimated based on the measured BER vs ROP curve. The predicted BER vs OSNR curve, a strong indication of the performance of the optical transceiver, can therefore facilitate the design, manufacture, and maintenance of the optical transceiver.

As used in this specification, the singular forms "a," "an" and "the" include plural referents unless the context clearly dictates otherwise. Thus, for example, the term "an optical modulator" is intended to mean a single optical modulator or multiple optical modulators. For another example, the term "an optical transceiver" is intended to mean a single optical transceiver or multiple optical transceivers.

Figure 1:
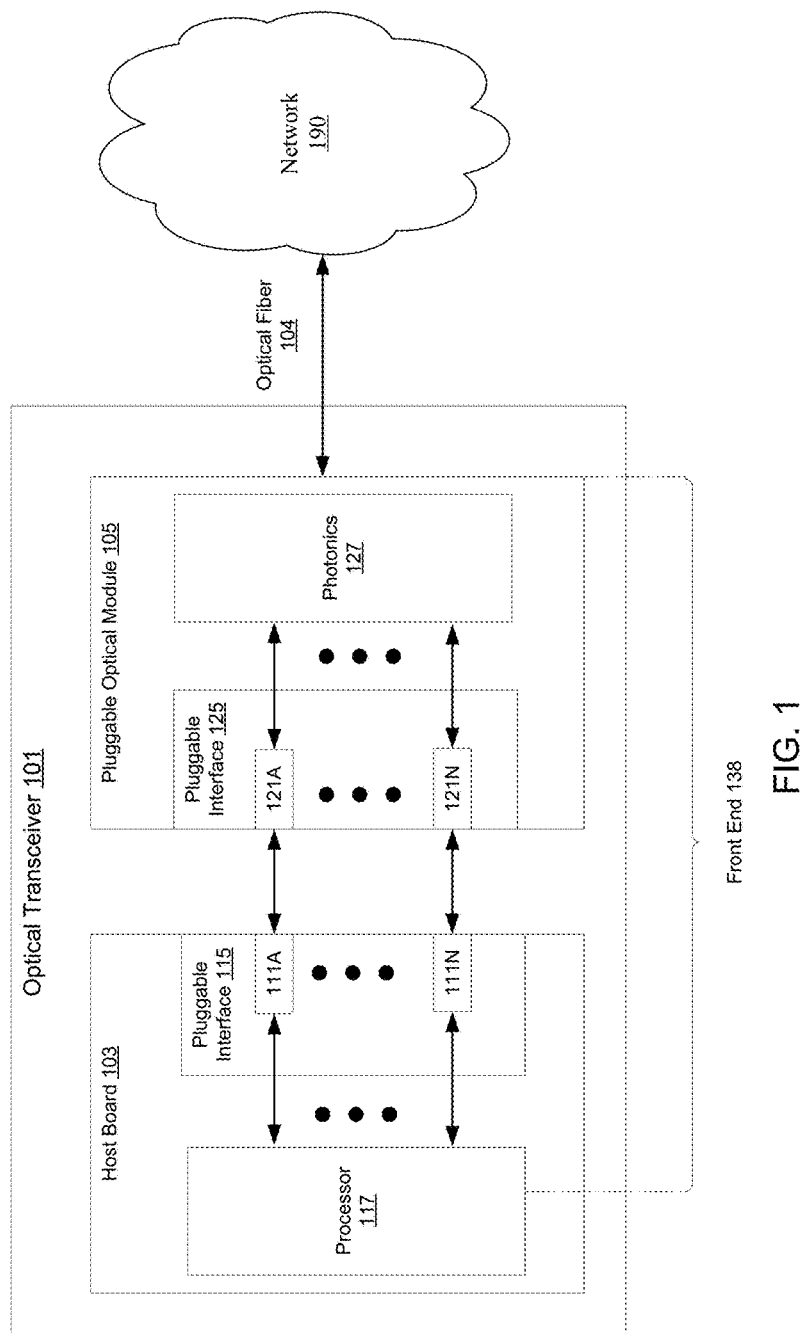
FIG. 1 is a block diagram illustrating an optical transceiver, according to an embodiment.

FIG. 1 is a block diagram illustrating an optical transceiver, according to an embodiment. The optical transceiver 101 can be any high data rate (e.g., 100 Gbps) optical transceiver such as a transceiver implementing intensity modulation with direct detection, e.g., a coherent optical transceiver, a coherent optical M-ary quadrature amplitude modulation (M-QAM) transceiver, a coherent polarization-multiplexed (PM) M-QAM transceiver, a coherent optical transceiver with a polarization-multiplexed 16 quadrature-amplitude-modulation (PM-16QAM) format, and/or the like. In coherent optical communication systems with a coherent optical transceiver, both magnitude and phase information are used to transmit and receive data such as for phase-shift keying modulation (e.g., BPSK, PM-BPSK, QPSK, PM-QPSK) or quadrature amplitude modulation (e.g., M-QAM, or PM-M-QAM).

The optical transceiver 101 can be a component of an optical communication device or system (e.g., a network device) such as a wavelength division multiplexing (WDM) system, including a dense wavelength division multiplexing (DWDM) system. For example, a WDM system can include multiple slots reserved for multiple boards, such as host board 103. Host board 103 is an example of a line card used in WDM systems. Each host board 103 can receive one or more removable "pluggable" photonics module 105 to provide optical connectivity for one or more optical fibers 104. Aspects of this disclosure, however, are not limited to WDM systems.

The optical transceiver 101 can be operatively coupled to a network 190 via optical fibers (e.g., 104). When the optical transceiver 101 is in a normal operating mode (or during an in-field measurement(s); not in a design verification test mode), the optical transceiver 101 can transmit optical signals to the network 190 via a one or more TX optical fiber (e.g., 104) and receive optical signals from the network 190 via a one or more RX optical fiber (e.g., 104). Examples of the network 190 include, but are not limited to, a fiber-optic network (e.g., a local area network (LAN), metropolitan area network (MAN), wide area network (WAN), or a long-haul network), or a converged network having functionalities of both a wireless network and a wired network.

The optical transceiver 101 includes a host board 103 and a coherent optical front-end 138. The coherent optical front-end 138 can include a subset of the components of the optical transceiver 101. For example, the coherent optical front-end 138 can include a pluggable optical module 105 and the components that interconnect the pluggable optical module 105 and the processor 117. The pluggable optical module 105 can be operatively coupled to the host board 103. For illustration purposes, the pluggable optical module 105 is described here. Embodiments described here, however, are not limited to pluggable optical modules and can also be applied to non-pluggable on-board optical components.

The host board 103 includes a processor 117 and a pluggable interface 115 operatively coupled to the processor 117. The pluggable interface 115 of the host board 103 is operatively coupled to the pluggable interface 125 of the pluggable optical module 105. In one implementation, the pluggable optical module 105 can be removably coupled to the host board 103. In another implementation, the pluggable optical module 105 can reside on the host board 103 or can be hardwired to the host board 103. The pluggable interface 115 can be an electrical interface in the case of non-pluggable on-board optical components or physical interface providing electrical connections between pluggable optical module 105 and host board 103.

The processor 117 can be or can include a general purpose processor, a field-programmable gate array (FPGA), an application specific integrated circuit (ASIC), a Digital Signal Processing (DSP) chip, a combination thereof, or other equivalent integrated or discrete logic circuitry. The processor 117 can include one or more analog-to-digital converters (ADCs) (not shown in the figure). The processor 117 can be configured to, for example, write data into and read data from a memory(ies) (not shown in FIG. 1), and execute the instructions stored within the memory(ies). The processor 117 can determine characteristics (e.g., BER) of the optical transceiver 101. In some implementations, based on the methods or processes stored within the memory, the processor 117 can be configured to execute an improved performance monitoring process, as described in FIG. 9. In some implementations, the improved performance monitoring process as described in FIG. 9 can also be executed in a processor (not shown in FIG. 1) of a layer higher than the layer of the host board 103, for example, in a processor of a management and control layer of the wavelength division multiplexing system (e.g., at a network management compute device operatively coupled to one or more optical transceivers 101 and configured to provide control, management, and/or configuration signals to the one or more optical transceivers 101).

The pluggable optical module 105 includes a pluggable interface 125 and photonics 127. The pluggable interface 125 can be an electrical interface in the case of non-pluggable on-board optical components or physical interface providing electrical connections between pluggable optical module 105 and host board 103. Pluggable interface 115 of the host board 103 and pluggable interface 125 of the pluggable optical module 105 can mate with one another to removably couple pluggable optical module 105 to host board 103. With pluggable interface 115 and pluggable interface 125, pluggable optical module 105 can be selectively coupled to or decoupled from host board 103. Details of the pluggable optical module 105 including the photonics 127 are described below with regards to FIG. 2.

In the receiver direction, when the optical transceiver 101 is in a normal operating mode (or during an in-field measurement(s); not in a design verification test mode), the pluggable optical module 105 can receive an optical data signal from the network 190, convert the optical data signal into electrical data signals, and output the electrical signals to processor 117 via the pluggable interface 125 and pluggable interface 115. The processor 117 can further process the analog electrical signals and reconstruct the data. In a WDM system, pluggable optical module 105 can receive higher data rate optical signals via optical fiber 104 from network 190, and convert the optical signals to electrical signals. Host board 103 can receive the electrical signals from pluggable optical module 105, and host board 103 or the other board deserializes the electrical signals into lower data rate electrical signals for transmission to the routers and switches (connected directly or indirectly to optical transceiver 101 and not shown in FIG. 1).

In the transmission direction, the processor 117 can send an electrical data signal(s) to the photonics 127 of the pluggable optical module 105 via the pluggable interface 115 and the pluggable interface 125. The photonics 127 of the pluggable optical module 105 can convert the electrical data signal(s) to an optical data signal(s) and further send the optical data signal(s) to the network 190 via the optical fiber 104 when the optical transceiver 101 is in a normal operating mode (or during an in-field measurement(s); not in a design verification test mode). In a WDM system, a chassis (not shown) can house various types of devices such as routers, servers, and the like, and can include host board 103. Host board 103 or another board connected to host board 103 receives lower data rate electrical signals from multiple devices such as switches or routers (not shown) that host board 103 or the other board serializes together into higher data rate electrical signals. Pluggable optical module 105 via photonics 127 converts the electrical signals to an optical signal(s) for further transmission into network 190 via optical fiber 104 when the optical transceiver 101 is in a normal operating mode (or during an in-field measurement(s); not in a design verification test mode).

Pluggable interface 125 includes connection points 121A-121N (collectively referred to as "connection points 121") and pluggable interface 115 includes connection points 111A-111N (collectively referred to as "connection points 111"). When pluggable optical module 105 couples to host board 103, connection points 121 can mate with corresponding connection points 111 to provide a continuous electrical path for data transmission and reception between pluggable optical module 105 and host board 103.

Figure 2:
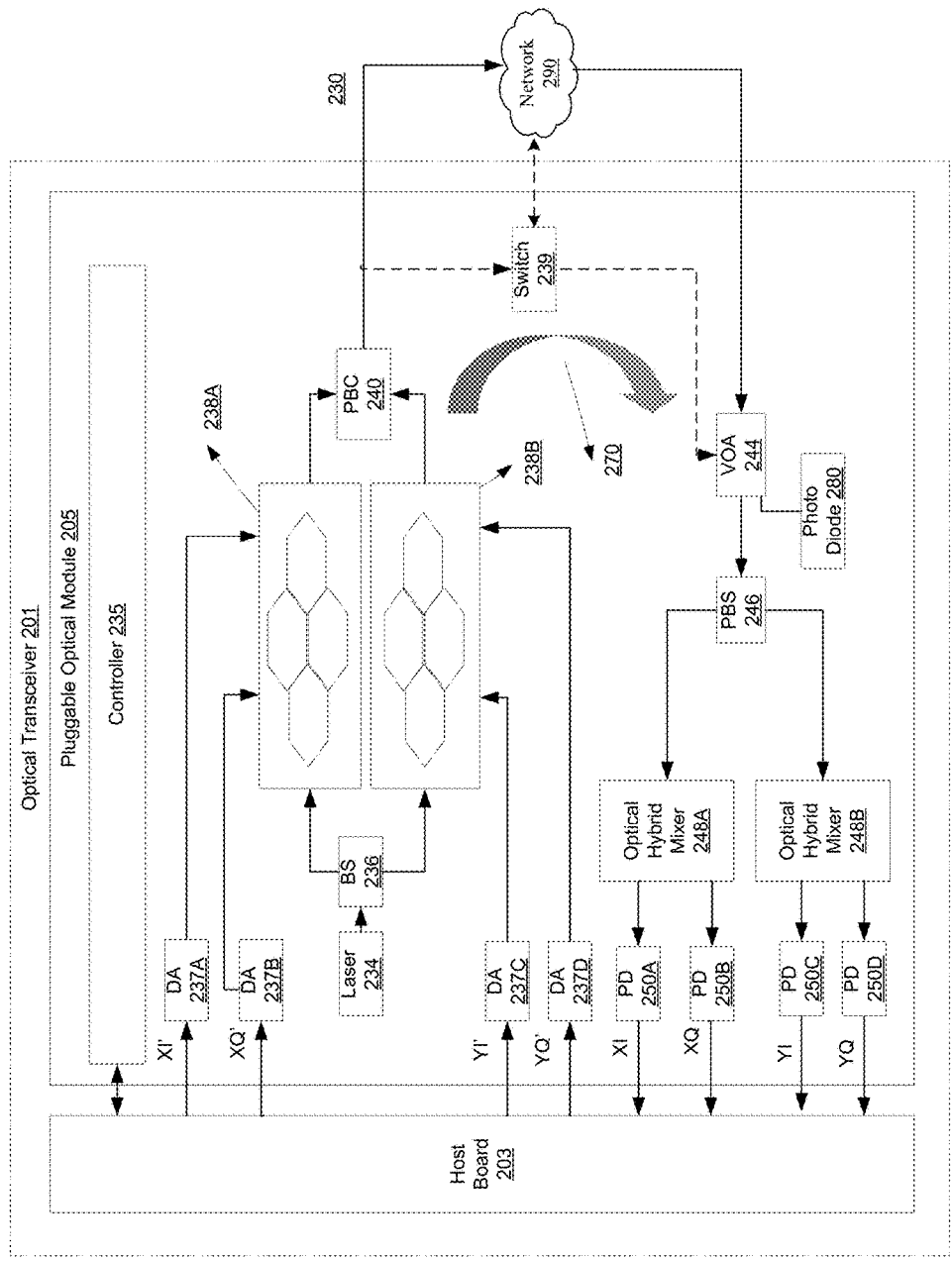
FIG. 2 is a block diagram illustrating photonic components within a pluggable optical module of an optical transceiver, according to an embodiment.

For example, as illustrated in more detail with respect to FIG. 2, photonics 127 of pluggable optical module 105 can include lasers, phase-modulating and amplitude-modulating optical hardware to mix pairs of data signals received from host board 103 to produce a set of optical signals for transmission. Photonics 127 can also include the optical hybrid mixers to convert the received optical signal(s) into the pairs (e.g., in-phase and quadrature) of electrical data signals, referred to as I and Q data signals, for transmission to host board 103.

In some examples, in addition, the modulated light wave in one polarization may be multiplexed with another modulated light wave in another polarization, which may be orthogonal to the previous one, to produce a polarization-multiplexed (PM) signal, such as PM-M-QAM, an example of which is PM-QPSK where M=4. The polarizations of the light wave signals may be chosen to be orthogonal to allow for a simple polarization beam splitter and digital signal processing to be used for polarization demultiplexing when photonics 127 receives optical data signals from network 190. For example, PM-QPSK modulation uses two input electrical data signals per polarization to impart the complex information on the optical carrier. The electrical signal for each polarization (e.g., polarization X and polarization Y) contains a pair of in-phase (I) and quadrature (Q) data signals that represent the complex data waveform. In this context, polarization X and polarization Y refer to any appropriate type of orthogonal polarizations such as for example vertical and horizontal polarization, or clockwise circular polarization and counterclockwise circular polarization.

For example, when the optical transceiver 101 is in a normal operating mode (e.g., during an in-field measurement(s); not in a design verification test mode), photonics 127 of pluggable optical module 105 receives a downstream optical signal from network 190 via optical fiber 104. In this example, the downstream optical signal is modulated in accordance with the PM-QAM (e.g., PM-QPSK) modulation scheme. Photonics 127 converts the downstream optical signal into two pairs of I and Q optical data signals, and converts the two pairs of I and Q optical data signals to two pairs of I and Q electrical data signals (referred to as pairs of I/Q electrical data signals for ease of reference). In this example, the pairs of I/Q electrical data signals together represent magnitude and phase information for the received signal. Photonics 127 transmits the pairs of I/Q electrical data signals to host board 103 via the electrical path provided by the mating of connection points 121 to connection points 111.

In long-haul optical communication systems, optical amplifiers can be used to compensate for the attenuation introduced by an optical fiber(s). While the optical signal(s) is boosted, noise is also added, which causes the decrease of optical signal noise ratio (OSNR) and increase of bit error ratio (BER). High BER can prevent or limit forward error correction (FEC) from correcting errors, which reduces or limits the transmission distance. Therefore, BER vs OSNR is monitored to measure the performance of an optical transceiver.

FIG. 2 is a block diagram illustrating photonic components within a pluggable optical module of an optical transceiver, according to an embodiment. The optical transceiver 201 can be structurally and functionally similar to the optical transceiver 101 described with regards to FIG. 1. The optical transceiver 201 can include a pluggable optical module 205 and a host board 203 operatively coupled to the pluggable optical module 205. The components of the pluggable optical module 205 are illustrated for PM-QAM modulation. Pluggable optical module 205 can include additional, fewer, or different components than those illustrated here without limiting the applicability of this disclosure. In alternate examples, pluggable optical module 205 can include different configurations and/or components to achieve PM-QAM modulation.

The transmit photonics of pluggable optical module 205 can include laser 234, controller 235, beam splitter (BS) 236, drive amplifiers 237A-237D, optical modulators 238A and 238B, and polarization beam combiner (PBC) 240. PBC 240 is operatively coupled to the network 290 via an optical link 230 (e.g., an optical fiber). In some situations, the pluggable optical module 205 receives electrical data signals from the host board 203, and converts the electrical data signals into modulated optical signals (e.g., a PM-16QAM modulated optical signal). The PBC 240 then outputs such modulated optical signals to the network 290 via the optical link 230 when the optical transceiver 201 is in a normal operating mode (or during an in-field measurement(s); not in a design verification test mode).

Drive amplifiers 237A-237D can amplify the voltage level of the electrical signals of the pair of in-phase (I) and quadrature (Q) data signals for each polarization, i.e., XI', XQ', YI', and YQ' data signals, output by host board 203. Laser 234 can be any type of laser that is usable for high bit rate optical signal transmission, typically a narrow linewidth laser in the 1550 nm wavelength range (so-called C-Band), but can be tuned to any wavelength within the operational range of the laser 234. Optical amplifiers (included in network 290 and not shown) operating in the same wavelength range can allow pluggable optical module 205 to transmit the modulated optical signal a relatively far distance appropriate for long-haul communication.

Beam splitter (BS) 236 receives the light from laser 234 and splits the light into (at least) two paths. Each one of optical modulators 238A and 238B receives light from one of the paths. Optical modulators 238A and 238B modulate the light on the respective paths with respective I/Q electrical data signal pairs. Optical modulators 238A and 238B may be referred to as IQ modulators or Cartesian modulators. In the example of FIG. 2, optical modulator 238A receives the XI' and XQ' electrical data signals from drive amplifiers 237A and 237B, respectively, and modulates the light received from laser 234 via BS 236 to form a complex modulated optical signal, modulated in both magnitude and phase, forming a first QAM signal. Optical modulator 238B receives YI' and YQ' electrical data signals from DAs 237C and 237D, respectively, and modulates the light received from laser 234 via BS 236 to form a complex modulated optical signal, modulated in both magnitude and phase, forming a second QAM signal.

A polarization rotator (not shown in FIG. 2.) can rotate the polarization of either the X arm or the Y arm by 90 degrees so that the polarization states from the X arm and the Y arm are orthogonal. Polarization beam combiner (PBC) 240 receives the polarized and modulated optical signals output from optical modulators 238A and 238B (each at a different polarization) and combines the polarized and modulated optical signals into a combined optical signal. For instance, the optical QAM signals from optical modulators 238A or 238B are then multiplexed in (nominally orthogonal) polarizations using PBC 240. For example, PBC 240 combines the received QAM optical signals into nominally orthogonal polarizations, i.e., into a single polarization-multiplexed (PM) optical signal with one component having X polarization and another component having Y polarization, and transmits the PM-QAM optical signal to network 290 via optical link 230.

In other words, optical modulator 238A modulates the light wave generated by laser 234 based on the XI' and XQ' electrical signals. Optical modulator 238B modulates the light wave generated by laser 234 based on the YI' and YQ' electrical signals. PBC 240 combines the first and second optical signals to form a polarization-multiplexed optical signal.

The controller 235 can be or can include a general purpose processor, a field-programmable gate array (FPGA), an application specific integrated circuit (ASIC), a combination thereof, or other equivalent integrated or discrete logic circuity. The controller 235 can include a processor (not shown in figure) and a memory (not shown in figure). The memory can be, for example, a random-access memory (RAM) (e.g., a dynamic RAM, a static RAM), a flash memory, and/or so forth. In some implementations, the memory can include or store, for example, a process, application, and/or some other software modules (stored and/or executing in hardware) or hardware modules.

When the optical transceiver 201 is in a normal operating mode (or during an in-field measurement(s); not in a design verification test mode), the receiver photonics of pluggable optical module 205 can receive a polarization-multiplexed optical signal from the network 290. For instance, the receiver photonics of pluggable optical module 205 can include a variable optical attenuator (VOA) 244, a polarization beam splitter (PBS) 246, a photo diode 280, optical hybrid mixers 248A and 248B, and balanced photo-detectors (PDs) 250A-250D. In some implementations, eight photo-detectors can form four pairs of balanced photo-diodes. Thus, each pair is illustrated as one photo-detector in FIG. 2.

The variable optical attenuator (VOA) 244 can include, for example, a Mach-Zehnder Modulator (MZM), a microelectromechanical system (MEMS), or other technology that varies an optical signal amplitude as a function of an applied electrical signal (not shown). The photo diode 280 can be operatively coupled to VOA 244 and can measure the receiver optical power (ROP) of the optical signals from the VOA 244. The measured ROP value can be calibrated by the controller 235 to account for the insertion loss of the optical hybrid mixers 248A-248B and the VOA 244. The ROP value, after being calibrated in some instances, can be sent to the host board 203 for predication of the BER v OSNR performance. In some situations, the ROP can also be measured by one of the photo-detectors (PDs) 250A-250D. The PBS 246 can receive an optical signal from the VOA 244 and split the received optical signal into first (XI and XQ) and second optical signals (YI and YQ) with nominally orthogonal polarization (or substantially orthogonal polarization, e.g., when the I and Q output waveforms are observed in the time domain, the Q channel lags the I Channel by +90±5 degrees.)

Each of the optical hybrid mixers 248A and 248B can mix the respective optical signals from PBS 246 with a local oscillator signal (not shown) and output optical data signals representing respective in-phase (I) and quadrature-phase (Q) components of the PM-QAM modulated signal to the PDs 250A-250D. For example, optical hybrid mixer 248A outputs XI and XQ optical data signals. Optical hybrid mixer 248B outputs YI and YQ optical data signals. In some examples, optical hybrid mixers 248A and 248B may be 90 degree optical hybrid mixers.

PDs 250A-250D can receive respective optical signals of the XI, XQ, YI, and YQ optical data signals and convert these optical signals into electrical signals (e.g., the XI, XQ, YI, and YQ data signals that the host board 203 receives). As noted above, photo-detectors 250A-250D may be composed of a pair of nominally balanced photo-diodes. A transimpedence amplifier (TIA) element (not shown) for each photo-detector 250A-250D may be used to convert the photo current from the photo-diode(s) to a voltage representation.

In this manner, when the optical transceiver 201 is in a normal operating mode (or during an in-field measurement(s); not in a design verification test mode), the receive photonics of the optical transceiver 201 can convert the PM-QAM (e.g., PM-16QAM) modulated optical signal into electrical I and Q data signal pairs (e.g., the XI, XQ, YI, and YQ data signals) for further processing by host board 203. For example, host board 203 receives the XI, XQ, YI, and YQ electrical data signal pairs from photo detectors 250A-250D, respectively, through the mating between connection points of the pluggable optical module 205 (such as 121A-121N in FIG. 1) and connection points of the host board 203 (such as 111A-111N in FIG. 1).

When the optical transceiver 201 is in a design verification test mode, such as during a manufacturing operation, a calibration operation, a trouble-shooting operation or an upgrading operation, the transmitter of the optical transceiver 201 can be configured to be connected to the receiver of the optical transceiver 201 through one of an optical switch 239 integrated within the optical transceiver, or an external loop-back connection 270. Such optical switch 239 and the loop-back connection 270 can facilitate the measurements of the receiver optical power (ROP) value and the bit error rate (BER) value at various baud rates. Details of the methods of the measurements are described below.

Figure 3:
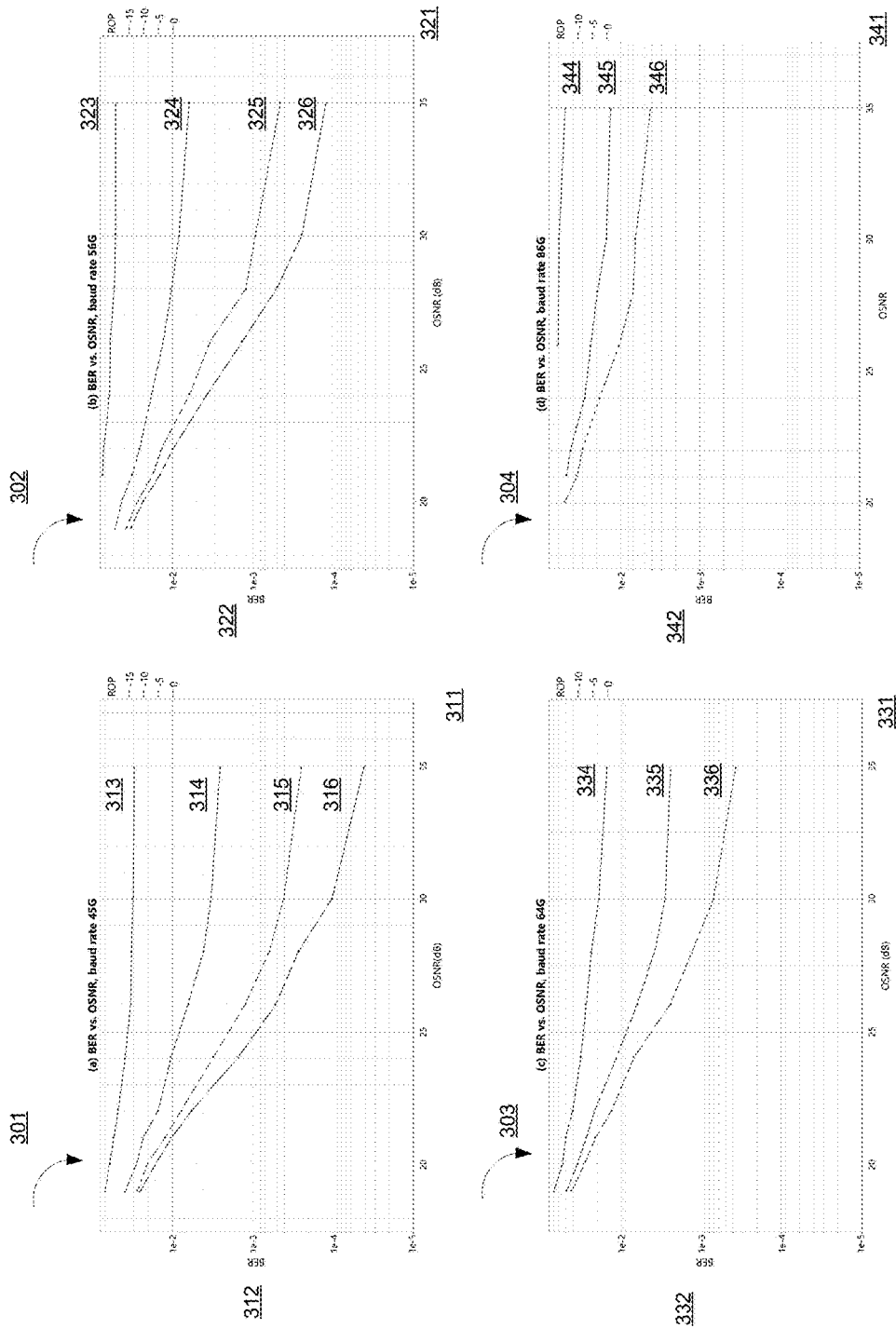
FIG. 3 shows examples of graphs of bit error rate (BER) vs optical signal noise ratio (OSNR) curves at different receiver optical power (ROP) values and different baud rate values, according to an embodiment.

FIG. 3 shows examples of graphs of BER vs OSNR curves at different ROP values and different baud rate values, according to an embodiment. At a fixed baud rate (e.g., 32 GHz) of the optical transceiver (such as the optical transceiver 101 in FIG. 1 or the optical transceiver 201 in FIG. 2), the performance of the BER vs OSNR curve can be predicated (or estimated) based on BER vs ROP curve using the analytical model (1).

$$OSNR_{calib} = \frac{10\wedge(OSNR^{dB}/10)*resBW}{2*bandRate} \quad (1)$$

$$ROP_{calib} = \frac{10\wedge(ROP^{dB}/10)*resBW}{2*bandRate}$$

$$\frac{1}{\kappa} + \frac{1}{OSNR_{calib}} + \frac{1}{\rho ROP_{calib}} = \frac{1}{SNR_{total}}$$

$$BER_{fit} = erfc\left(\sqrt{\eta SNR_{total}}\right)$$

$$\theta = \frac{1}{n}\sum_{i=1}^{n}\left(\frac{BER_{fit} - BER_{measure}}{BER_{fit}}\right)^2$$

$$BER_{floor} = erfc\left(\sqrt{\eta*\kappa}\right)$$

Here, the "baudRate" is the baud rate of electrical signal including a FEC overhead, "resBW" is 12.5 GHz (0.1 nm) against which the OSNR is measured, and "η" and "κ" are two fitting parameters. The analytical model solves the value of each of the two fitting parameters "η" and "κ" by minimizing the error between the measurement result and the curve-fitting result. "κ" is related to the noise floor and "η" is related to filter mismatching or bandwidth. The parameter, p, represents the consideration of ~45 dB OSNR at 0 dBm ROP value. In some instances, p can be for example equal to 31622 (45 dB).

In some implementations, the fitting parameters of "η" and "κ" can be extracted from the BER vs ROP measurements, during an in-field measurement (or a normal operating mode), or in a design verification test mode of the optical transceiver such as a manufacturing operation, a calibration operation, a trouble-shooting operation or an upgrading operation. Fitting parameter ρ can be determined during a design verification testing process. These fitting parameters can be further used to predict (or estimate) the BER value at certain OSNR values. In some instances, at a fixed baud rate (e.g., 32 GHz), the fitting parameter η can be between 0.82 and 0.9, and fitting parameter κ can be between 14.6 and 20.7. In some instances, fitting parameter η is equal to 0.85 and fitting parameter κ is equal to 17.6.

In one implementation, these fitting parameters can be stored in EEPROM of the line-card. The network management compute device (not shown) or the multi-layer optimization tool can extract those parameters, and perform network management and optimization. For example, in the initial planning and optimization of a network, the network management compute device can obtain the fitting parameters from EEPROM of the optical transceiver. A multi-layer optimization tool (e.g., at the processor 117 of the host board 103 in FIG. 1) can be used to predict the BER vs OSNR performance, and determine where to place the particular line-card based on the transmission distance. When the network is in an in-field measurement(s) (or a normal operating mode), a dynamic re-routing of a certain signal may be necessary due to events such as, but not limited to, fiber cut and equipment failure. After the signal is re-routed, the OSNR of the signal may change due to a different transmission distance and/or different transmission characteristics of the new path. In this scenario, the network management compute device or the multi-layer optimization tool can predict the BER vs OSNR performance based on those fitting parameters, and determine whether this new route is feasible for a particular optical transceiver.

The change of baud rate might be caused by the underlying data rate or the overhead of forward error correction (FEC). Higher underlying data rate increases the throughput, and larger overhead of FEC increases the tolerance to amplified spontaneous emission (ASE) noise. For example, a flex-grid re-configurable optical add drop multiplexer (F-ROADM) enables the transmission of signal with various baud rates over an optical line system.

Returning to FIG. 3, graph 301 shows examples of BER vs OSNR curves at a baud rate of 45 GHz. Graph 302 shows examples of BER vs OSNR curves at a baud rate of 56 GHz. Graph 303 shows examples of BER vs OSNR curves at a baud rate of 64 GHz. Graph 304 shows examples of BER vs OSNR curves at a baud rate of 86 GHz. In graph 301, the x-axis 311 is the measured OSNR value and the y-axis 312 is the measured BER value. The BER vs OSNR curve 313 is measured when the ROP is equal to −15 dBm. The BER vs OSNR curve 314 is measured when the ROP is equal to −10 dBm. The BER vs OSNR curve 315 is measured when the ROP is equal to −5 dBm. The BER vs OSNR curve 316 is measured when the ROP is equal to 0. Similarly, in graph 302, the x-axis 321 is the measured OSNR value and the y-axis 322 is the measured BER value. The BER vs OSNR curve 323 is measured when the ROP is equal to −15 dBm. The BER vs OSNR curve 324 is measured when the ROP is equal to −10 dBm. The BER vs OSNR curve 325 is measured when the ROP is equal to −5 dBm. The BER vs OSNR curve 326 is measured when the ROP is equal to 0.

In graph 303, the x-axis 331 is the measured OSNR value and the y-axis 332 is the measured BER value. The BER vs OSNR curve 334 is measured when the ROP is equal to −10 dBm. The BER vs OSNR curve 335 is measured when the ROP is equal to −5 dBm. The BER vs OSNR curve 336 is measured when the ROP is equal to 0. Similarly, in graph 304, the x-axis 341 is the measured OSNR value and the y-axis 342 is the measured BER value. The BER vs OSNR curve 344 is measured when the ROP is equal to −10 dBm. The BER vs OSNR curve 345 is measured when the ROP is equal to −5 dBm. The BER vs OSNR curve 346 is measured when the ROP is equal to 0. As shown in graphs 301-304, the performance of the optical transceiver decreases as the baud rate increases.

Figure 4:
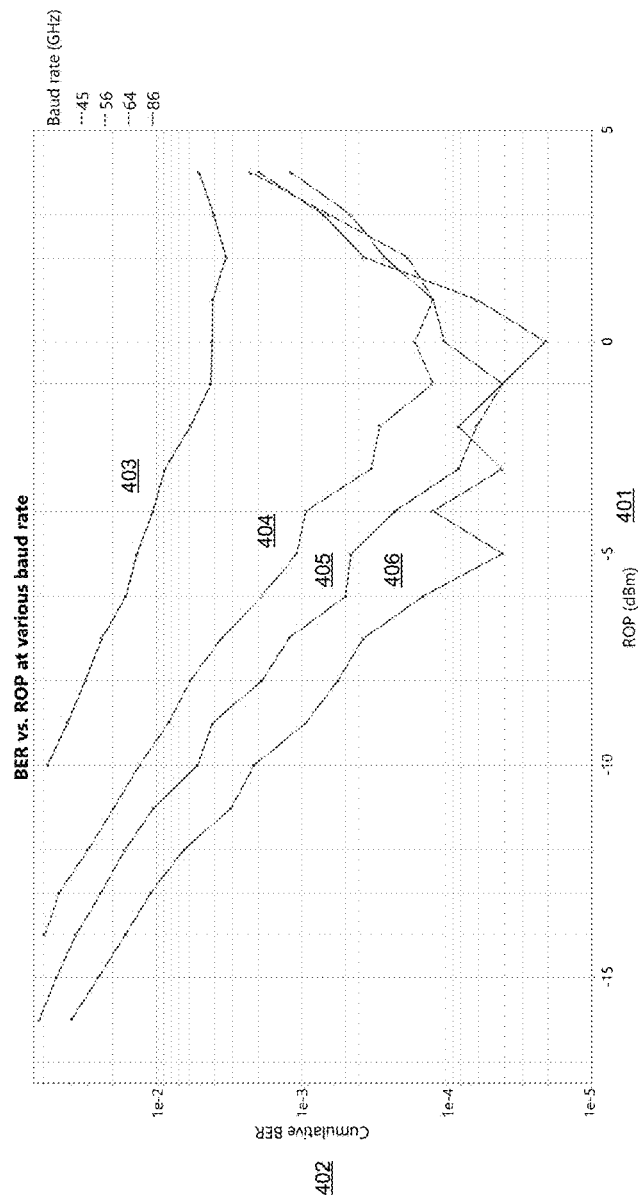
FIG. 4 shows examples of graphs of BER vs ROP curves at different ROP values and different baud rate values, according to an embodiment.

FIG. 4 shows examples of graphs of BER vs ROP curves at different ROP values and different baud rate values, according to an embodiment. The x-axis 401 is the measured ROP value and the y-axis 402 is the measured BER value. The BER vs ROP curve 403 is measured when the baud rate value is equal to 86 GHz. The BER vs ROP curve 404 is measured when the baud rate value is equal to 64 GHz. The BER vs ROP curve 405 is measured when the baud rate value is equal to 56 GHz. The BER vs ROP curve 406 is measured when the baud rate value is equal to 45 GHz. As shown in the BER vs ROP curves 403-406, the performance of the optical transceiver decreases as the baud rate increases.

Figure 5:
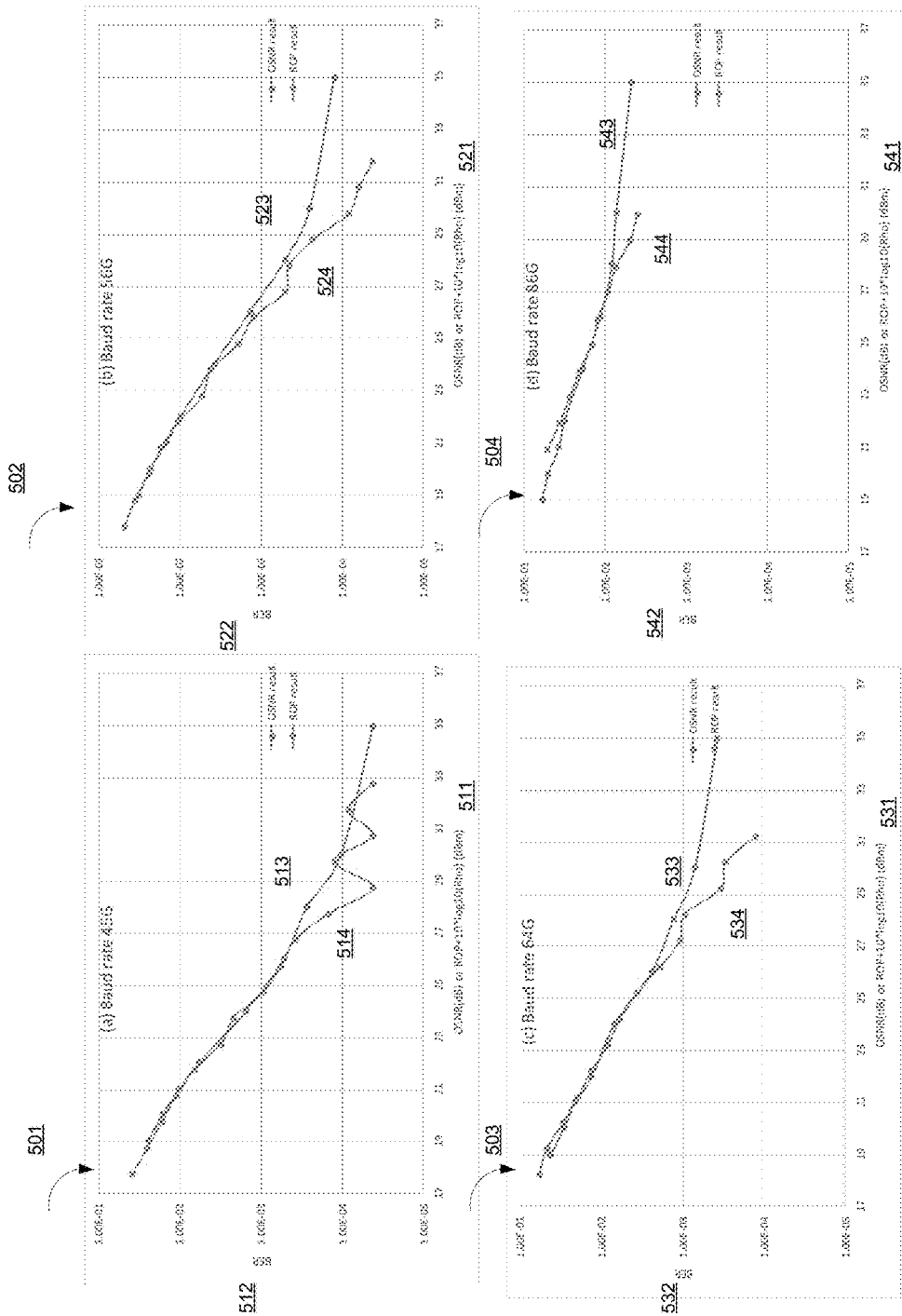
FIG. 5 shows examples of the correlation between the measured BER vs. OSNR curve and the measured BER vs. ROP curve at each baud rate value from a set of baud rate values, according to an embodiment.

FIG. 5 shows examples of the correlation between the measured BER vs. OSNR curve and the measured BER vs. ROP curve at each baud rate value from a set of baud rate values, according to an embodiment. In graph 501, the x-axis 511 is the measured OSNR value and a shifted ROP value. The shifted ROP value is the measured ROP value shifted towards right by an amount of 10*log 10(ρ). The y-axis 512 is the measured BER value. The BER vs. OSNR curve 513 and the BER vs. ROP curve 514 are measured when the baud rate value is equal to 45 GHz. Similarly, in graph 502, the x-axis 521 is the measured OSNR value and a shifted ROP value. The shifted ROP value is the measured ROP value shifted towards right by an amount of 10*log 10(ρ). The y-axis 522 is the measured BER value. The BER vs. OSNR curve 523 and the BER vs. ROP curve 524 are measured when the baud rate value is equal to 56 GHz. Similarly, in graph 503, the x-axis 531 is the measured OSNR value and a shifted ROP value. The shifted ROP value is the measured ROP value shifted towards right by an amount of 10*log 10(ρ). The y-axis 532 is the measured BER value. The BER vs. OSNR curve 533 and the BER vs. ROP curve 534 are measured when the baud rate value is equal to 64 GHz. Similarly, in graph 504, the x-axis 541 is the measured OSNR value and a shifted ROP value. The shifted ROP value is the measured ROP value shifted towards right by an amount of 10*log 10(ρ). The y-axis 542 is the measured BER value. The BER vs. OSNR curve 543 and the BER vs. ROP curve 544 are measured when the baud rate value is equal to 86 GHz. As shown in graphs 501-504, the measured BER vs. OSNR curves 513, 523, 533, and 543, overlap substantially with the measured BER vs. ROP curves, 514, 524, 534, and 544, respectively, when the OSNR value and the ROP value are relatively lower.

In some implementations, the parameter "ρ" can be equal to 31622 (45 dB), for the consideration of −45 dB OSNR at 0 dBm ROP value. Because noise is proportional to the receiver bandwidth, which can be set at 0.8*B, where B is the baud rate value, ρ can be represented as $$\rho(B)=\rho(B_0)*B_0/B \qquad (2)$$

Here, $\rho(B_0)$ is the value of ρ at baud rate $B_0$. $B_0$ is equal to 45 GHz in the experiment results. In some implementations, to calculate the fitting parameters η and κ from the BER vs ROP curves, the BER values are selected when the corresponding ROP values are less than −7 dBm. This is because at higher ROP values, other nonlinearity and/or noise (e.g., shot noise, receiver saturation or total harmonic distortion) can contribute to overall OSNR performance. In some instances, the value of −7 dBm is a hyper-parameter, which can be transponder-dependent and can be determined during a design verification test.

Figure 6:
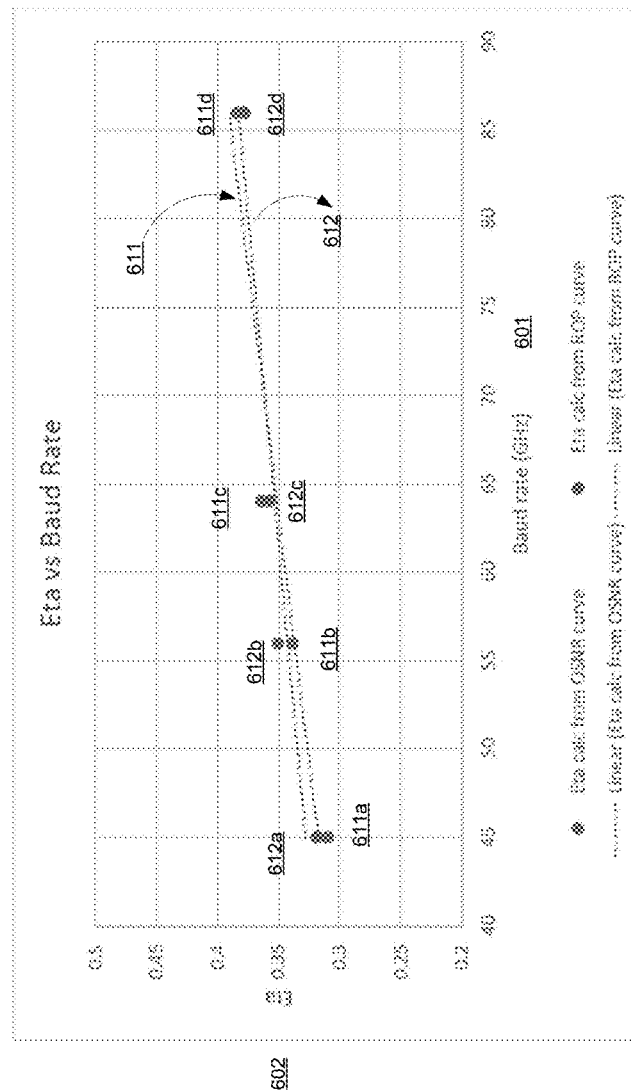
FIG. 6 shows examples of the relationship between the fitting parameter η and the baud rate value B, according to an embodiment.

FIG. 6 shows examples of the relationship between the fitting parameter η and the baud rate value B, according to an embodiment. The x-axis 601 is the baud rate value B and the y-axis 602 is the calculated and fitted values of the fitting parameter η. The values of the fitting parameter η 611a-611d are calculated from the BER vs OSNR curves at baud rate values of 45 GHz, 56 GHz, 64 GHz, and 86 GHz. The values of the fitting parameter η 612a-612d are calculated from the BER vs ROP curves at baud rate values of 45 GHz, 56 GHz, 64 GHz, and 86 GHz. The relationship between the calculated fitting parameter η and the baud rate value B are linearly fitted into two curves 611 and 612.

Figure 7:
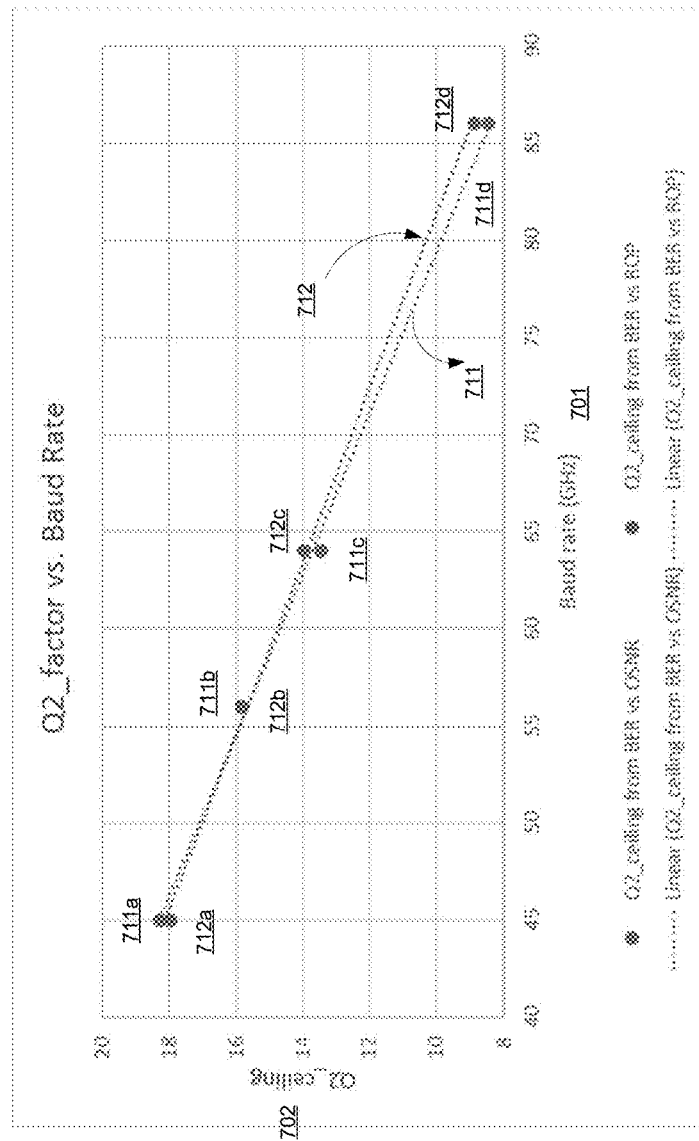
FIG. 7 shows examples of the relationship between the Q2 ceiling factor and the baud rate value B, according to an embodiment.

In some implementations, the optical transceiver bandwidth is 0.8 times of the baud rate value. When the baud rate value increases, the optical transceiver bandwidth increases accordingly. In some implementations, the filter mismatching (represented by parameter η) between the coherent optical transceiver and the optical signal can remain nearly constant. In other implementations, the filter mismatching parameter η changes linearly with baud rate value at a small slope as shown in FIG. 7. This deviation can be due to an implementation of coherent optical transceiver within the experimental setup. For example, the arbitrary waveform generator works at 92 Gsample/s. At 86 GHz baud rate, the sample per bit is 1.07, which is well below the 2 samples per bit required by Nyquist theorem. In some implementations, this under-sampling can introduce distortion to the coherent optical signal and cause η to change at various baud rates. As shown in the FIG. 6, the relationship between the fitting parameter η and the baud rate value B can be expressed as a linear curve fitting:

$$\eta(B)=\alpha_0 B+\beta_0 \qquad (3)$$

Here $\alpha_0$, $\beta_0$ are the linear coefficients.

FIG. 7 shows examples of the relationship between the Q2_ceiling factor and the baud rate value B, according to an embodiment. The x-axis 701 is the baud rate value B and the y-axis 702 is the calculated and fitted values of Q2_ceiling factor. In some implementations, the Q2 ceiling factor 702 can be calculated from the noise floor of the BER values. The values of the Q2 ceiling factor 711a-711d are calculated from the BER vs OSNR curves at baud rate values of 45 GHz, 56 GHz, 64 GHz, and 86 GHz. The values of the Q2_ceiling factor 712a-712d are calculated from the BER vs ROP curves at baud rate values of 45 GHz, 56 GHz, 64 GHz, and 86 GHz. The relationship between the calculated Q2_ceiling factor values and the baud rate values B are linearly fitted into two curves 711 and 712.

As shown in the FIG. 7, the Q2 ceiling factor degrades linearly against the baud rate B. The relationship between the Q2 ceiling factor and the baud rate value B can be expressed as a linear curve fitting with linear coefficients $\alpha_1$, $\beta_1$. In some implementations, once the linear coefficients ($\alpha_1$ $\beta_1$) from Q2 ceiling factor vs B curve are determined, the Q2 ceiling factor can be predicted at any baud rate value. The BER floor value can be determined based on the Q2 ceiling factor. Based on the model (4), the fitting parameter κ as a function of the baud rate value B can be calculated.

$$Q2\_ceiling(B)\approx\alpha_1*B+\beta_1$$

$$BER\_floor(B)=erfc(\sqrt{Q\_ceiling(B)/2})=erfc(\sqrt{\eta\kappa})$$

$$\kappa(B)=Q\_ceiling(B)/2/\eta(B)=(\alpha_1*B+\beta_1)/2/(\alpha_0*B+\beta_0) \qquad (4)$$

In some implementations, when it is determined how the fitting parameters ρ, η, and κ change over the baud rate value B based on the BER vs ROP measurements at various baud rate values (e.g., from 32 GHz to 86 GHz) for a given optical transceiver, the BER vs OSNR curve at various baud rate values can be predicated (or estimated). Specifically, $\rho(B_0)$ is the ρ factor at base baud rate $B_0$, determined from the correlation between the BER vs. OSNR curve and the BER vs ROP curve at base baud rate $B_0$. In one example, the base baud rate $B_0$ is 45 GHz. The parameters $\alpha_0$ and $\beta_0$ are linear fitting coefficients for η vs B, determined from the BER vs. ROP curves. The fitting parameters $\alpha_1$ and $\beta_1$ are linear fitting coefficients for Q2_ceiling vs B, determined from the BER vs. ROP curves. The linear fitting coefficients $\alpha_1$ and $\beta_1$, can be used to determine the fitting parameter κ at different baud rate values. $ROP_{th}$ is the threshold for ROP. When the ROP is smaller than $ROP_{th}$, the corresponding BER values are used to perform the curve fitting. This can be advantageous to eliminate the influence of shot noise, saturation and nonlinearity on the ROP curves.

In some implementations, $\rho(B_0)$ and $ROP_{th}$ can be determined during a design verification test (DVT). The linear fitting coefficients, $\alpha_0 \beta_0 \alpha_1$ and $\beta_1$, can be determined from DVT or from in-field measurement(s). For the purpose of router planning tools or the abstraction of coherent optical transceiver, the values of the linear fitting coefficients, $\alpha_0 \beta_0 \alpha_1$ and $\beta_1$, can be determined from DVT. The values of the linear fitting coefficients, $\alpha_0\beta_0\alpha_1\beta_1$, can be measured in the in-field measurement(s). For example, during the maintenance without live traffic, an internal built-in optical switch can loop the optical signal between the coherent transmitter and the coherent receiver of an optical transceiver. Using a built-in VOA and a photo diode, the BER vs. ROP curve at various baud rates can be measured. In turn, the values of the linear fitting coefficients, $\alpha_0$ $\beta_0$ $\alpha_1$ and $\beta_1$, can be determined in the in-field measurement(s) without much disturbing of the live traffic. The degradation in the BER vs. OSNR performance from the model can be monitored. Once the degradation (or the performance) of the coherent optical transceiver meets a criteria (e.g., the BER value is predicted to be lower than $10^{-3}$ when the OSNR is equal to 30 dB, the ROP is equal to 10 dBm and the baud rate is equal to 86 GHz), in some implementations, the coherent optical transceiver can be reconfigured, replaced, re-assigned to a shorter router, or re-adjusted (or reconfigured) to a lower baud rate. In some implementations, once the degradation (or the performance) of the coherent optical transceiver meets a criteria, the optical transceiver can send the data signals via a planned route.

For example, in the initial planning and optimization of a network, a network management compute device (a hardware device external to the optical transceiver 101 in FIG. 1) can obtain the fitting parameters from EEPROM of the optical transceiver(s). A multi-layer optimization tool (e.g., hardware device external to the optical transceiver 101 in FIG. 1) can be used to predict the BER vs OSNR performance at various baud rate values, and determine where to place (or how to configure) the particular line-card based on the transmission distance. When the network is in a normal operating mode (i.e., during an in-field measurement(s)), a dynamic re-routing of a certain signal may be necessary due to events such as, but not limited to, fiber cut and equipment failure. After the signal is re-routed, the OSNR of the signal may change due to a different transmission distance (of different characteristics of the alternative transmission path). In this scenario, the network management compute device or the multi-layer optimization tool can predict the BER vs OSNR performance based on those fitting parameters, and determine whether this new route is feasible for a particular optical transceiver.

In some implementations, during optical transmission over a relatively long distance, additional optical impairments, for example, the chromatic dispersion (CD), polarization mode dispersion (PMD) with first order PMD being differential group delay (DGD), and carrier frequency offset (CFO) can occur (or be generated). A coherent optical transceiver (such as the optical transceiver 101 in FIG. 1) together with a digital signal processing (DSP) chip can recover the signals even with a large amount of CD and PMD present. In some situations, the DSP chip can be included in the processor (such as processor 117 in FIG. 1) of the host board (such as host board 103 in FIG. 1). The coherent optical transceiver can report the estimated CD values. The DGD value is linearly proportional to the PMD value. In some situations, additional BER degradation is present due to these optical impairments. The optical transceiver (e.g., the processor 117 in FIG. 1 or the host board 103 in FIG. 1) can receive a signal indicating a chromatic dispersion (CD) value, a differential group delay (DGD) value, or a carrier frequency offset (CFO) value. The optical transceiver (e.g., the processor 117 in FIG. 1 or the host board 103 in FIG. 1) can improve accuracy of the estimated performance of the optical transceiver (i.e., BER vs OSNR curve) at the baud rate value based on at least one of the CD value, the DGD value, or the CFO value.

In some implementations, when it is determined how the fitting parameters $\rho$, $\eta$, and $\kappa$ change over the baud rate value B based on the BER vs ROP measurements at various baud rate values (e.g., from 32 GHz to 86 GHz), the optical transceiver can measure a set of BER values at various baud rate values and determine an estimated OSNR value from a set of estimated OSNR values at each BER value of the set of BER values. A predicted BER vs OSNR curve can be determined based on the set of BER values and the set of estimated OSNR values. Thus, the performance of the optical transceiver can be monitored. In other implementations, when it is determined how the fitting parameters $\rho$, $\eta$, and $\kappa$ change over the baud rate value B based on the BER vs ROP measurements at various baud rate values (e.g., from 32 GHz to 86 GHz), the optical transceiver can measure a set of OSNR values at various baud rate values and determine an estimated BER value from a set of estimated BER values at each OSNR value of the set of OSNR values. A predicted BER vs OSNR curve can be determined based on the set of estimated BER values and the set of OSNR values. Thus, the performance of the optical transceiver can be monitored.

Figure 8:
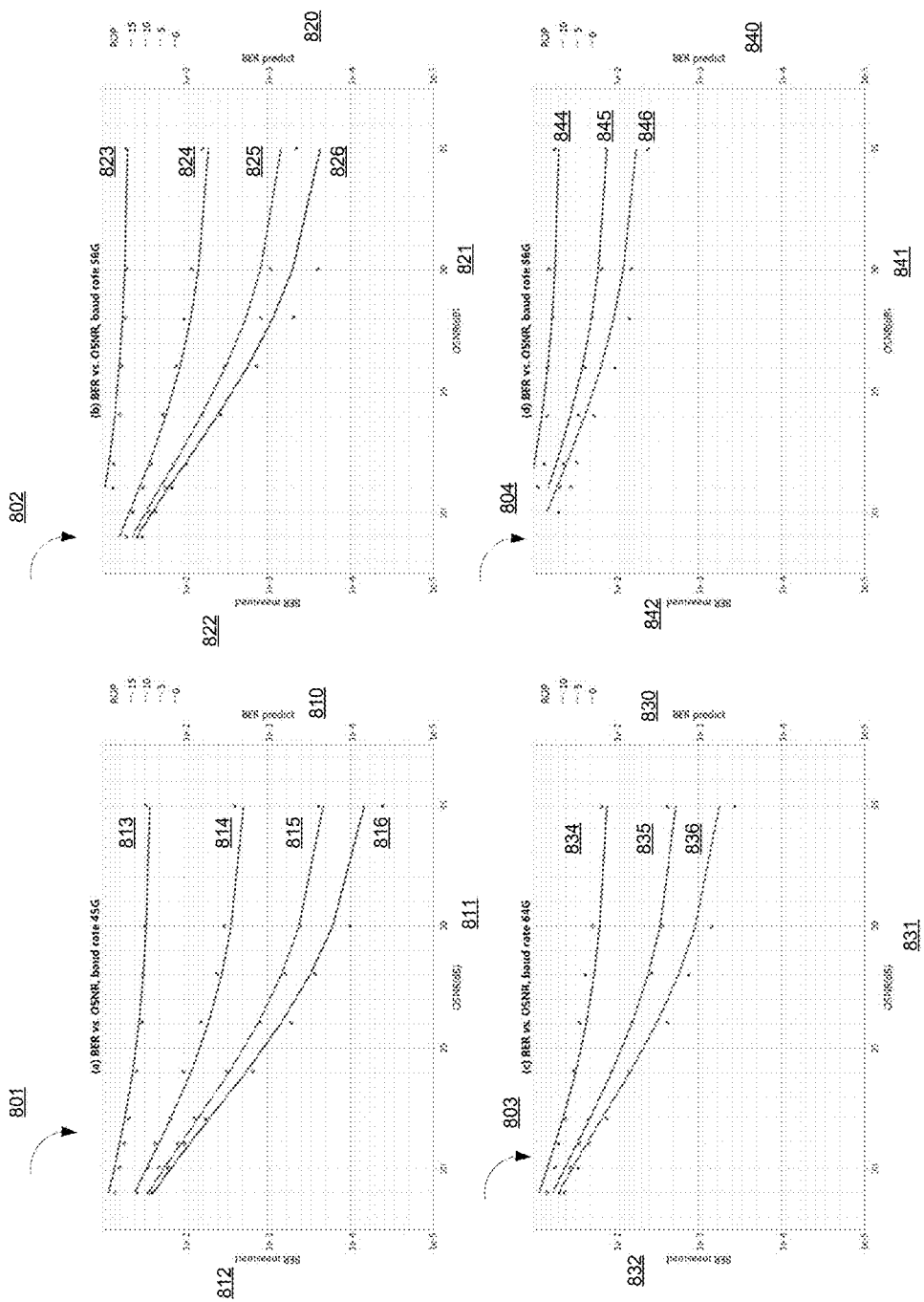
FIG. 8 shows examples of the comparison between the measured BER vs OSNR values and the predicted BER vs OSNR curves at various baud rate values, according to an embodiment.

FIG. 8 shows examples of the comparison between the measured BER vs OSNR values and the predicted BER vs OSNR curves at various baud rate values, according to an embodiment. In graph 801, the x-axis 811 is the OSNR value at a baud rate value of 45 GHz. The y-axis on the left 812 is the measured BER value at the baud rate value of 45 GHz and the y-axis on the right 810 is the predicted BER value at the baud rate value of 45 GHz. Curve 813 represents a predicted performance of BER vs OSNR when the ROP is equal to −15 dBm. The dots near the curve 813 represent the measured performance of BER vs OSNR when the ROP is equal to −15 dBm. Curve 814 represents a predicted performance of BER vs OSNR when the ROP is equal to −10 dBm. The dots near the curve 814 represent the measured performance of BER vs OSNR when the ROP is equal to −10 dBm. Curve 815 represents a predicted performance of BER vs OSNR when the ROP is equal to −5 dBm. The dots near the curve 815 represent the measured performance of BER vs OSNR when the ROP is equal to −5 dBm. Curve 816 represents a predicted performance of BER vs OSNR when the ROP is equal to 0. The dots near the curve 816 represent the measured performance of BER vs OSNR when the ROP is equal to 0.

Similarly, in graph 802, the x-axis 821 is the OSNR value at a baud rate value of 56 GHz. The y-axis on the left 822 is the measured BER value at the baud rate value of 56 GHz and the y-axis on the right 820 is the predicted BER value at the baud rate value of 56 GHz. Curve 823 represents a predicted performance of BER vs OSNR when the ROP is equal to −15 dBm. The dots near the curve 823 represent the measured performance of BER vs OSNR when the ROP is equal to −15 dBm. Curve 824 represents a predicted performance of BER vs OSNR when the ROP is equal to −10 dBm. The dots near the curve 824 represent the measured performance of BER vs OSNR when the ROP is equal to −10 dBm. Curve 825 represents a predicted performance of BER vs OSNR when the ROP is equal to −5 dBm. The dots near the curve 825 represent the measured performance of BER vs OSNR when the ROP is equal to −5 dBm. Curve 826 represents a predicted performance of BER vs OSNR when the ROP is equal to 0. The dots near the curve 826 represent the measured performance of BER vs OSNR when the ROP is equal to 0.

In graph 803, the x-axis 831 is the OSNR value at a baud rate value of 64 GHz. The y-axis on the left 832 is the measured BER value at the baud rate value of 64 GHz and the y-axis on the right 830 is the predicted BER value at the baud rate value of 64 GHz. Curve 834 represents a predicted performance of BER vs OSNR when the ROP is equal to −10 dBm. The dots near the curve 834 represent the measured performance of BER vs OSNR when the ROP is equal to −10 dBm. Curve 835 represents a predicted performance of BER vs OSNR when the ROP is equal to −5 dBm. The dots near the curve 835 represent the measured performance of BER vs OSNR when the ROP is equal to −5 dBm. Curve 836 represents a predicted performance of BER vs OSNR when the ROP is equal to 0. The dots near the curve 836 represent the measured performance of BER vs OSNR when the ROP is equal to 0.

In graph 804, the x-axis 841 is the OSNR value at a baud rate value of 86 GHz. The y-axis on the left 842 is the measured BER value at the baud rate value of 86 GHz and the y-axis on the right 840 is the predicted BER value at the baud rate value of 86 GHz. Curve 844 represents a predicted performance of BER vs OSNR when the ROP is equal to −10 dBm. The dots near the curve 844 represent the measured performance of BER vs OSNR when the ROP is equal to −10 dBm. Curve 845 represents a predicted performance of BER vs OSNR when the ROP is equal to −5 dBm. The dots near the curve 845 represent the measured performance of BER vs OSNR when the ROP is equal to −5 dBm. Curve 846 represents a predicted performance of BER vs OSNR when the ROP is equal to 0. The dots near the curve 846 represent the measured performance of BER vs OSNR when the ROP is equal to 0.

As shown in the examples illustrated in graphs 801-804, the predicted performance of BER vs OSNR at various baud rate values overlaps substantially with the measured performance of BER vs OSNR at various baud rate values. The predicted performance of BER vs OSNR at various baud rate values overlaps better with the measured performance of BER vs OSNR at various baud rate values, when the OSNR is in a lower region. When the OSNR is in a higher region, the difference between the measurement performance and the predicted performance might be due to the estimation error in the fitting parameter $\kappa$. Some possible causes include, but are not limited to, non-additive white Gaussian noise (AWGN) type of noise, receiver saturation, nonlinearity like total harmonic distortion, and/or the like.

FIG. 9 is a flow chart illustrating a method of an improved OSNR performance measurement of an optical transceiver, according to an embodiment. This method can be implemented at a processor of an optical transceiver (e.g., processor 117 in FIG. 1) or at a processor of a layer higher than the layer of the host board (such as host board 103 in FIG. 1). In some instances, the processor of a layer higher than the layer of the host board can be a processor of a management and control layer of the wavelength division multiplexing system. The method includes, when the optical transceiver is in a design verification test (DVT) mode, measuring, via a photo diode, a set of receiver optical power (ROP) values at a set of baud rate values (e.g., from 32 GHz to 86 GHz) and sending the set of ROP values to the processor at 902. The DVT mode of the optical transceiver can include a manufacturing operation, a calibration operation, a trouble-shooting operation or an upgrading operation. During the DVT, a transmitter of the optical transceiver is connected to a receiver of the optical transceiver through an optical switch integrated within the optical transceiver, or through an external loop-back connection. The optical transceiver can modulate optical signals in one of a set of modulation formats including polarization-multiplexed quadrature-phase-shift-keying (PM-QAM), polarization-division-multiplexed quadrature-phase-shift-keying (PDM-QPSK), and polarization-division-multiplexed quadrature-amplitude-modulation (PDM-QAM). The optical transceiver can modulate optical signals, for example, in 8-QAM, 16-QAM, 32-QAM, or 64-QAM.

At 908, the processor measures a set of bit error rate (BER) values of a digital modulated signal at the set of baud rate values at an input port of the optical transceiver. The processor can measure, based on the BER vs ROP curve, the set of BER values at different ROP values and derive how the fitting parameters $\eta$, $\kappa$, and $\rho$ change as a function of the baud rate. Fitting parameter $\eta$ represents a bandwidth parameter. Fitting parameter $\kappa$ represents a noise-floor parameter. In some instances, fitter parameter "p" can be equal to 31622 (45 dB), for the consideration of ~45 dB OSNR at 0 dBm ROP value. In some implementations, parameters $\rho(B_0)$, $ROP_{th}$ and linear fitting coefficients, $\alpha_0\beta_0\alpha_1$ and $\beta_1$, can be determined based on the BER vs ROP curve at various baud rate values. $\rho(B_0)$ and $ROP_{th}$ can be determined during a design verification test (DVT). The linear fitting coefficients, $\alpha_0\beta_0\alpha_1$ and $\beta_1$, can be determined from DVT or from in-field measurement(s). For the purpose of router planning tools or the abstraction of coherent optical transceiver, the values of the linear fitting coefficients, $\alpha_0\beta_0\alpha_1$ and $\beta_1$, can be determined from DVT. The values of the linear fitting coefficients, $\alpha_0\beta_0\alpha_1$ and $\beta_1$, can be measured in the in-field measurement(s). For example, during the maintenance without live traffic, an internal built-in optical switch can loop the optical signal between the coherent transmitter and the coherent receiver. Using a built-in VOA and a photo diode, the BER vs. ROP curve at various baud rates can be measured. In turn, the values of the linear fitting coefficients, $\alpha_0\beta_0\alpha_1$ and $\beta_1$, can be determined in the in-field measurement(s) without much disturbing of the live traffic. Such fitting parameters and linear fitting coefficients are stored in the optical transceiver, such as stored in EEPROM, database or other storage medium of the optical transceiver.

In some implementations, the digital modulated signal is coherently detected at the input port of the optical transceiver. Similarly stated, the amplitude information and the phase information of the electrical field of the digital modulated signal can be recovered via the coherent detection. In some instances, the electrical field from the digital modulated signal and the electrical field from the noise (e.g., the additive white Gaussian noise (AWGN)) can be added.

At 910, the processor determines an estimated optical signal noise ratio (OSNR) value at a baud rate value from the set of baud rate values at the input port of the optical transceiver based on the set of ROP values and the set of BER values. In some implementations, based on the measured BER values and the fitting parameters $\eta$, $\kappa$, and $\rho$ (including parameters $\rho(B_0)$, $ROP_{th}$ and linear fitting coefficients, $\alpha_0\beta_0\alpha_1$ and $\beta_1$), the OSNR values can be estimated. In other implementations, the OSNR values can be measured at each baud rate value from the set of baud rate values. Based on the measured OSNR values and the fitting parameters $\eta$, $\kappa$, and $\rho$ (including parameters $\rho(B_0)$, $ROP_{th}$ and linear fitting coefficients, $\alpha_0\beta_0\alpha_1$ and $\beta_1$), the BER values can be estimated. Thus, the BER vs OSNR curve can be determined and used to evaluate the performance of the optical transceiver. In some implementations, the processor receives a signal indicating a chromatic dispersion (CD) value, a differential group delay (DGD) value, and a carrier frequency offset (CFO) value in a normal operation. The processor uses the CD value, the DGD value, or the CFO value to improve accuracy of the estimated performance of BER vs OSNR.

In some implementations, when it is determined how the fitting parameters ρ, η, and κ change over the baud rate value B based on the BER vs ROP measurements at various baud rate values (e.g., from 32 GHz to 86 GHz), the optical transceiver can measure a set of BER values at various baud rate values (e.g., step 908) and determine an estimated OSNR value from a set of estimated OSNR values at each BER value of the set of BER values (e.g., step 910). A predicted BER vs OSNR curve can be determined based on the set of BER values and the set of estimated OSNR values. Thus, the performance of the optical transceiver can be monitored. In other implementations, when it is determined how the fitting parameters ρ, η, and κ change over the baud rate value B based on the BER vs ROP measurements at various baud rate values (e.g., from 32 GHz to 86 GHz), the optical transceiver can measure a set of OSNR values at various baud rate values and determine an estimated BER value from a set of estimated BER values at each OSNR value of the set of OSNR values. A predicted BER vs OSNR curve can be determined based on the set of estimated BER values and the set of OSNR values. Thus, the performance of the optical transceiver can be monitored.

At 912, the processor sends a signal indicating the estimated OSNR value such that a planned route is selected for sending data signals through within the optical transceiver based on the estimated OSNR value. In some implementations, this step is performed during a DVT. In other implementations, this step is performed during an in-field measurement(s) on request or at a predetermined time interval (e.g., daily, weekly.) In some implementations, this step is performed when the optical transceiver is operational in a network (such as the network 190 in FIG. 1.) If there is a decreased performance based on the estimated BER vs OSNR performance of the optical transceiver, the processor can send a signal to alert the performance degradation for route planning and network management. In another embodiment, such measurements and prediction can be used to assist or facilitate a network operator to determine performance of the optical transceiver at various baud rate values. For example, during a maintenance window, once the BER vs ROP is measured, a current set of fitting parameters η, κ, and ρ is determined as a function of the baud rate, and the network operator can compare the current set of fitting parameters with the original values of the fitting parameters stored in EEPROM. Based on the comparison results, the network operator can determine whether any performance degradation of the optical transceiver is presented and can raise an alarm (or request maintenance or replacement) accordingly. For example, when the degradation (or the performance) of the coherent optical transceiver meets a criteria (e.g., the BER value is predicted to be lower than $10^{-3}$ when the OSNR is equal to 30 dB, the ROP is equal to 10 dBm and the baud rate is equal to 86 GHz), in some implementations, the coherent optical transceiver can be reconfigured, replaced, re-assigned to a shorter router, or re-adjusted to a lower baud rate. In some implementations, once the degradation (or the performance) of the coherent optical transceiver meets a criteria, the optical transceiver can send the data signals via a planned route.

In some embodiments, the method described with regards to FIG. 9 can be implemented at a processor of an optical transceiver (e.g., processor 117 in FIG. 1) or at a processor of a layer higher than the layer of the host board (such as host board 103 in FIG. 1). In other embodiments, the method can be implemented at a coherent optical channel monitor (OCM). In some implementations, the OCM can be implemented at the receiver path of a coherent optical transceiver (such as the optical transceiver 101 in FIG. 1). The OCM can include optical components such as a variable optical attenuator, a 90-degree optical hybrid, a balanced photo diode(s), a linear trans-impedance amplifier, an integrated tunable laser assembly (ITLA). The OCM can also include electronic components such as a processor, a memory, a digital signal processor (DSP), and/or software modules (stored and/or executing in hardware), and/or the like.

In some implementations, the OCM can be configured to measure the set of ROP values at a set of baud rate values. The OCM can be configured to measure a set of bit error rate (BER) values of a digital modulated signal at the set of baud rate values. The OCM can be configured to determine an estimated optical signal noise ratio (OSNR) value at a baud rate value from the set of baud rate values based on the set of ROP values at the set of baud rate values and the set of BER values at the set of baud rate values. The OCM can be configured to send a signal indicating the estimated OSNR value at the baud rate value such that a planned route is selected to send data signals based on the estimated OSNR value.

In some implementations, other parameters, like chromatic dispersion, differential group delay, frequency offset, and polarization dependent loss, can be monitored by the OCM. In some implementations, the OCM can be coherent. In some implementations, the OCM does not carry the traffic, which allows the customization to reduce the power consumption. For example, within the DSP chip, certain functions can be turned off to save power consumption. For a re-configurable optical add drop multiplexer (ROADM) with multiple degrees, an optical switch can be placed in front of the coherent OCM, allowing monitoring of the traffic in all degrees.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
an optical transceiver configured to be operatively coupled to a network, the optical transceiver including a photo diode and a processor configured to be operatively coupled to the photo diode,
the photo diode configured to measure a plurality of receiver optical power (ROP) values at a plurality of baud rate values and send the plurality of ROP values to the processor,
the processor configured to measure a plurality of bit error rate (BER) values of a digital modulated signal at the plurality of baud rate values at an input port of the optical transceiver,
the processor configured to determine an estimated optical signal noise ratio (OSNR) value at a baud rate value from the plurality of baud rate values at the input port of the optical transceiver based on the plurality of ROP values at the plurality of baud rate values and the plurality of BER values at the plurality of baud rate values,
the processor configured to send a signal indicating the estimated OSNR value at the baud rate value such that a planned route is selected to send data signals based on the estimated OSNR value.

2. The apparatus of claim 1, wherein:
the optical transceiver is configured to modulate optical signals in a modulation format from a plurality of modulation formats including polarization-multiplexed 16-quadrature amplitude modulation (PM-16QAM).

3. The apparatus of claim 1, wherein:
the plurality of baud rate values is within a range of about 32 GHz to 86 GHz.

4. The apparatus of claim 1, wherein:
during a design verification test of the optical transceiver, a transmitter of the optical transceiver is configured to be connected to a receiver of the optical transceiver through at least one of (1) an optical switch integrated within the optical transceiver, or (2) an external loopback connection.

5. The apparatus of claim 1, wherein:
the processor is configured to receive a signal indicating a chromatic dispersion (CD) value, a differential group delay (DGD) value, or a carrier frequency offset (CFO) value,
the processor is configured to improve accuracy of the estimated OSNR value at the baud rate value based on at least one of the CD value, the DGD value, or the CFO value.

6. The apparatus of claim 1, wherein:
the processor is configured to determine a plurality of bandwidth parameter values at the plurality of baud rate values based on the plurality of ROP values at the plurality of baud rate values and the plurality of BER values at the plurality of baud rate values;
the processor is configured to determine the estimated OSNR value at the baud rate value based on the plurality of bandwidth parameter values at the plurality of baud rate values.

7. The apparatus of claim 6, wherein the processor is configured to determine the plurality of bandwidth parameter values during one of a design verification test of the optical transceiver or an in-field measurement of the optical transceiver.

8. The apparatus of claim 1, wherein:
the processor is configured to determine a plurality of noise floor parameter values at the plurality of baud rate values based on the plurality of ROP values at the plurality of baud rate values and the plurality of BER values at the plurality of baud rate values;
the processor is configured to determine the OSNR value at the baud rate value based on the plurality of noise floor parameter values at the plurality of baud rate values.

9. The apparatus of claim 1, wherein:
the signal is a first signal,
the processor is configured to send a second signal when the estimated OSNR value at the baud rate value meets a criteria such that the optical transceiver is reconfigured.

10. The apparatus of claim 1, wherein the processor is configured to not send the data signals.

11. The apparatus of claim 1, wherein the processor is configured to receive the digital modulated signal at the input port of the optical transceiver via a coherent detection.

12. An apparatus, comprising:
an optical transceiver configured to be operatively coupled to a network, the optical transceiver including a variable optical attenuator (VOA) and a processor operatively coupled to the VOA,
the VOA configured to vary a receiver optical power (ROP) parameter to obtain a plurality of ROP values at a plurality of baud rate values,
the processor configured to measure a plurality of bit error rate (BER) values in response to the plurality of ROP values at the plurality of baud rate values,
the processor configured to estimate a plurality of optical signal noise ratio (OSNR) values at the plurality of baud rate values based on the plurality of BER values and the plurality of ROP values,
the processor configured to send a signal when an OSNR value from the plurality of OSNR values meets a criteria such that the optical transceiver is reconfigured.

13. The apparatus of claim 12, wherein the optical transceiver is configured to modulate optical signals in a modulation format from a plurality of modulation formats including polarization-multiplexed 16-quadrature amplitude modulation (PM-16QAM).

14. The apparatus of claim 12, wherein:
the processor is configured to determine a plurality of bandwidth parameter values at the plurality of baud rate values based on the plurality of ROP values at the plurality of baud rate values and the plurality of BER values at the plurality of baud rate values;

the processor is configured to estimate the plurality of OSNR values at the plurality of baud rate values based on the plurality of bandwidth parameter values at the plurality of baud rate values.

15. The apparatus of claim 12, wherein:
the processor is configured to determine a plurality of noise floor parameter values at the plurality of baud rate values based on the plurality of ROP values at the plurality of baud rate values and the plurality of BER values at the plurality of baud rate values;
the processor is configured to estimate the plurality of OSNR values at the plurality of baud rate values based on the plurality of noise floor parameter values at the plurality of baud rate values.

16. The apparatus of claim 15, wherein the processor is configured to determine the plurality of noise floor parameter values during one of a design verification testing of the optical transceiver or an in-field measurement of the optical transceiver.

17. The apparatus of claim 12, wherein:
the processor is configured to receive a signal indicating a chromatic dispersion (CD) value, a differential group delay (DGD) value, or a carrier frequency offset (CFO) value,
the processor is configured to improve accuracy of the plurality of OSNR values based on at least one of the CD value, the DGD value, or the CFO value.

18. The apparatus of claim 12, wherein the processor is configured to determine the plurality of OSNR values at the plurality of baud rate values without additional hardware.

19. The apparatus of claim 12, wherein:
the signal is a first signal;
the criteria is a first criteria;
the processor is configured to send a second signal when an OSNR value from the plurality of OSNR values meets a second criteria such that a planned route is selected to send data signals based on the OSNR value.

20. The apparatus of claim 12, wherein:
a transmitter of the optical transceiver is configured to be connected to a receiver of the optical transceiver through at least one of (1) an optical switch integrated within the optical transceiver, or (2) an external loop-back connection.

21. A method, comprising:
measuring a plurality of receiver optical power (ROP) values of an optical transceiver at a plurality of baud rates, the optical transceiver configured to be operatively coupled to a network, a transmitter of the optical transceiver connected to a receiver of the optical transceiver during a design verification test of the optical transceiver;
measuring a plurality of bit error rate (BER) values at the plurality of baud rates at an input port of the optical transceiver;
determining an estimated optical signal noise ratio (OSNR) value at a baud rate from the plurality of baud rates at the input port of the optical transceiver based on the plurality of ROP values and the plurality of BER values; and
sending a signal indicating the estimated OSNR value at the baud rate such that a planned route is selected to send data signals based on the estimated OSNR value at the baud rate.

22. An apparatus, comprising:
a memory; and
a processor operatively coupled to the memory, the processor configured to be operatively coupled to a photo diode of an optical transceiver,
the processor configured to receive a plurality of receiver optical power (ROP) values at a plurality of baud rate values from the photo diode,
the processor configured to measure a plurality of bit error rate (BER) values of a digital modulated signal at the plurality of baud rate values,
the processor configured to determine an estimated optical signal noise ratio (OSNR) value at a baud rate value from the plurality of baud rate values based on the plurality of ROP values at the plurality of baud rate values and the plurality of BER values at the plurality of baud rate values,
the processor configured to send a signal indicating the estimated OSNR value at the baud rate value such that a planned route is selected to send data signals based on the estimated OSNR value.

\* \* \* \* \*